US012585676B1

(12) United States Patent
Sinha et al.

(10) Patent No.: US 12,585,676 B1
(45) Date of Patent: Mar. 24, 2026

(54) SYSTEM AND METHOD FOR DEEP LARGE LANGUAGE MODEL THINKING WITH GRADIENT FEEDBACK ALIGNMENT

(71) Applicant: Intuit Inc., Mountain View, CA (US)

(72) Inventors: Ankita Sinha, Mountain View, CA (US); Jiaxin Zhang, Mountain View, CA (US); Kamalika Das, Saratoga, CA (US); Sricharan Kallur Palli Kumar, Mountain View, CA (US); Wendi Cui, Jersey City, NJ (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/224,593

(22) Filed: May 30, 2025

(51) Int. Cl.
G06F 16/332          (2025.01)
G06F 16/3329        (2025.01)
G06F 16/338          (2019.01)

(52) U.S. Cl.
CPC ...... *G06F 16/3326* (2019.01); *G06F 16/3329* (2019.01); *G06F 16/338* (2019.01)

(58) Field of Classification Search
CPC .................................................. G06F 16/3326
See application file for complete search history.

(56) References Cited

U.S. PATENT DOCUMENTS

2024/0256965 A1 *   8/2024   Chung ................... G06N 20/00
2024/0362422 A1 *   10/2024  Callegari ............... G06F 9/543

OTHER PUBLICATIONS

Es, Shahul, "Aligning LLM as judge with human evaluators," https://blog.ragas.io/aligning-llm-as-judge-with-human-evaluators, Dec. 11, 2024, 7 pages.

Wallace, Bram, "Diffusion Model Alignment Using Direct Preference Optimization," arXiv:2311.12908v1 [cs. CV] Nov. 21, 2023, 25 pages.

Pryzant, Reid, "Automatic Prompt Optimization with "Gradient Descent" and Beam Search," arXiv:2305.03495v2 [cs.CL] Oct. 19, 2023, 12 pages.

Cheng, Jiale, "Black-Box Prompt Optimization: Aligning Large Language Models without Model Training," Proceedings of the 62nd Annual Meeting of the Association for Computational Linguistics (vol. 1: Long Papers), pp. 3201-3219, Aug. 11-16, 2024.

Cui, Wendi, PhaseEvo: Towards Unified In-Context Prompt Optimization for Large Language Models, arXiv:2402.11347v.1 [ cs.CL] Feb. 17, 2024. 50 pages.

(Continued)

*Primary Examiner* — Van H Oberly
(74) *Attorney, Agent, or Firm* — Paradice & Li LLP

(57) ABSTRACT

A large language model (LLM) is refined using an unsupervised alignment process for enhanced reasoning and deep thinking capabilities. An iterative search and optimization procedure is used to explore the space of possible thought generations enabling the model to improve deep thinking capabilities without direct supervision. The LLM is prompted to produce a first thought and response pair in response to a query. The thought and response pair is evaluated with a trained judge LLM, which provides feedback for the thought and for the response. A revised prompt is generated in response to the feedback and provided to the LLM, which produces second thought and response pair. The LLM is refined based on the first, non-preferred, thought and response pair and the second, preferred, thought and response pair to align with the preferred thought and response pair, e.g., using a direct preference optimization process.

18 Claims, 7 Drawing Sheets

100

(56)                References Cited

OTHER PUBLICATIONS

Wang, Peifeng, "Direct Judgement Preference Optimization," arXiv:2409.14664v2 [cs. CL] Sep. 30, 2024, 29 pages.
Rafailov, Rafael, "Direct Preference Optimization: Your Language Model is Secretly a Reward Model," arXiv:2305.18290v3 [cs.LG] Jul. 29, 2024, 27 pages.
Lu, Junru, "FIPO: Free-form Instruction-oriented Prompt Optimization with Preference Dataset and Modular Fine-tuning Schema," generarXiv: 2402.11811v4 [cs.CL] Dec. 9, 2024, 19 pages.
Zheng, Lianmin, "Judging LLM-as-a-Judge with MT-Bench and Chatbot Arena," arXiv:2306.05685v4 [cs.CL] Dec. 24, 2023, 29 pages.
Wang, Yizhong, "Self-Instruct: Aligning Language Models with Self-Generated Instructions," Proceedings of the 61st Annual Meeting of the Association for Computational Linguistics, vol. 1: Long Papers, pp. 13484-13508 Jul. 9-14, 2023.
Yuan, Weizhe, "Self-Rewarding Language Models," arXiv:2401.10020v2 [cs.CL] Feb. 8, 2024, 23 pages.
Xiao, Wenyi, "A Comprehensive Survey of Direct Preference Optimization: Datasets, Theories, Variants, and Applications," arXiv:2410.15595v2 [cs.Al] Nov. 10, 2024, 37 pages.

* cited by examiner

600

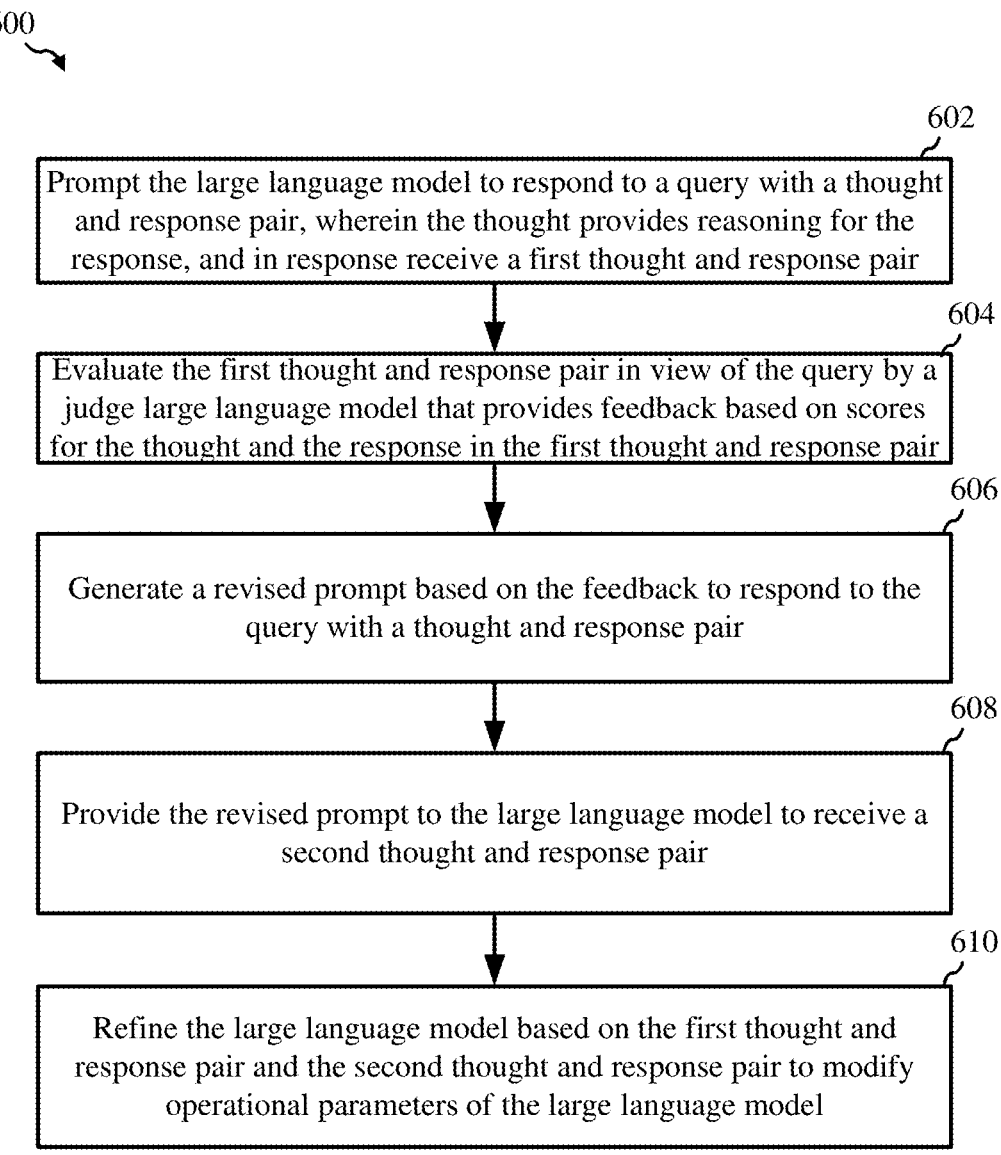

602

Prompt the large language model to respond to a query with a thought and response pair, wherein the thought provides reasoning for the response, and in response receive a first thought and response pair

604

Evaluate the first thought and response pair in view of the query by a judge large language model that provides feedback based on scores for the thought and the response in the first thought and response pair

606

Generate a revised prompt based on the feedback to respond to the query with a thought and response pair

608

Provide the revised prompt to the large language model to receive a second thought and response pair

610

Refine the large language model based on the first thought and response pair and the second thought and response pair to modify operational parameters of the large language model

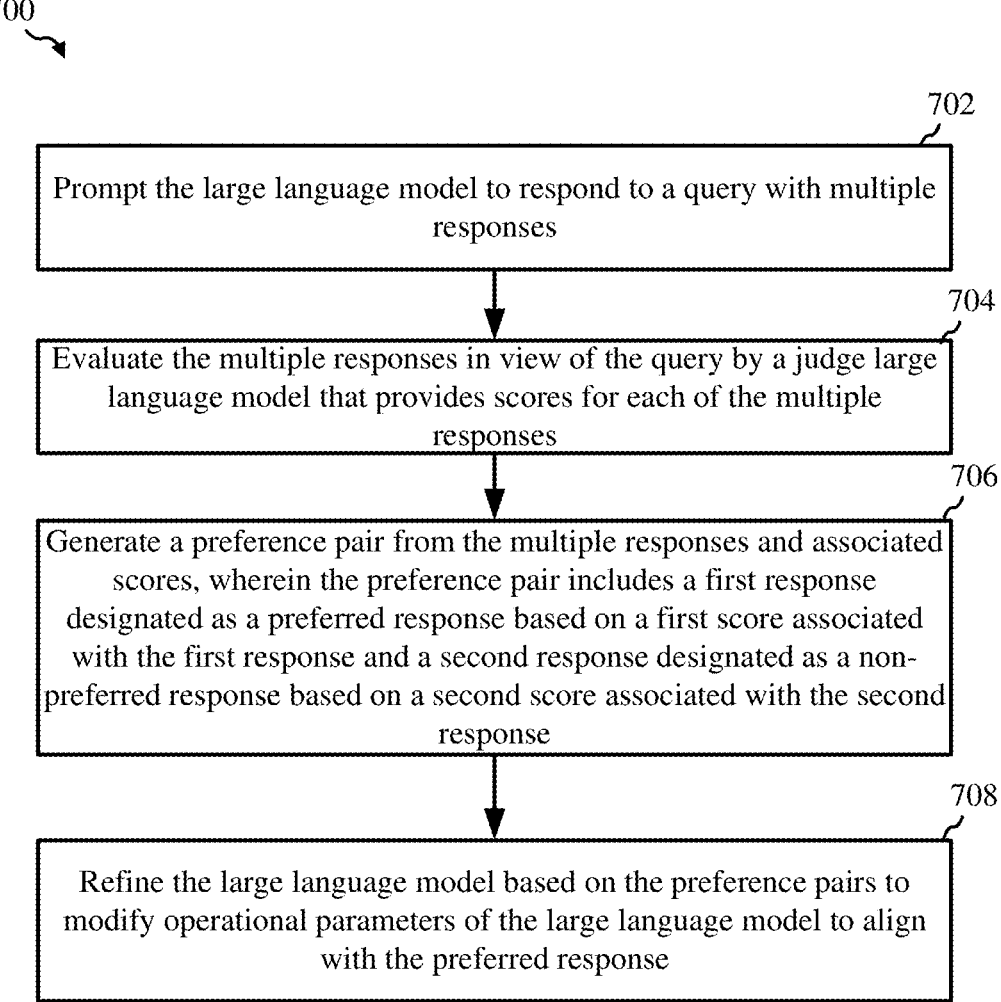

Prompt the large language model to respond to a query with multiple responses

704

Evaluate the multiple responses in view of the query by a judge large language model that provides scores for each of the multiple responses

706

Generate a preference pair from the multiple responses and associated scores, wherein the preference pair includes a first response designated as a preferred response based on a first score associated with the first response and a second response designated as a non-preferred response based on a second score associated with the second response

708

Refine the large language model based on the preference pairs to modify operational parameters of the large language model to align with the preferred response

FIG. 7

SYSTEM AND METHOD FOR DEEP LARGE LANGUAGE MODEL THINKING WITH GRADIENT FEEDBACK ALIGNMENT

TECHNICAL FIELD

This disclosure relates generally to the field of artificial intelligence and machine learning, and more specifically to systems and methods for enhancing reasoning and deep thinking capabilities in large language models.

BACKGROUND

Recent advancements in artificial intelligence have led to the development of large language models (LLMs) that can generate human-like text, answer complex questions, and perform tasks across a wide array of domains. These models, often built on transformer architectures, have demonstrated remarkable capabilities in natural language understanding and generation. Deep Large Language Models (LLMs) represent class of LLMs that are enhanced or augmented to reason through multi-step problems, engage in extended contextual inference, or simulate aspects of deliberate or reflective thought. Deep LLMs may include architectures with increased processing layers, or additional modules like memory systems, attention routing, scratchpads, or structured reasoning workflows layered on top of base LLMs that enable more sophisticated feature extraction and reasoning.

LLMs are typically pretrained using unsupervised learning techniques, such as predicting the next word in a sequence (autoregressive modeling) or masked language modeling, followed by fine-tuning on specific tasks to enhance performance. During pretraining, the model is exposed to massive corpora of text data in an unsupervised manner, learning to predict the next token in a sequence, which equips the model with general linguistic and factual knowledge. Fine-tuning is then employed to adapt the model with specific tasks or behaviors using supervised learning or reinforcement learning from human feedback (RLHF). Despite this layered training process, traditional LLMs operate based on pattern recognition rather than true understanding, and their outputs are the result of probabilistic associations rather than structured reasoning. Standard LLMs are trained to predict likely text, not necessarily to reason or to solve problems in a human-preferred way. A deep-thinking LLM may engage in chain-of-thought, tool use, hypothesis testing, or recursive self-evaluation. These techniques, however, introduce more decision points and complex behaviors, increasing the risk of hallucinations, invalid logic, misinterpreting instructions, producing unsafe reasoning chains, etc. Thus, despite their capabilities, deep LLMs sometimes exhibit these notable deficiencies that limit their reliability and efficiency. These shortcomings highlight the need for innovative approaches to enhance reasoning and efficiency in LLMs.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

A large language model (LLM) may be refined using an unsupervised alignment process for enhanced reasoning and deep thinking capabilities. An iterative search and optimization procedure is used to explore the space of possible thought generations enabling the model to improve deep thinking capabilities without direct supervision. The LLM may be prompted to produce multiple responses, which are evaluated with a trained judge LLM, from which a preferred response and non-preferred response is selected. The LLM may be refined based on the preferred and non-preferred responses to optimize the policy of the LLM to align with the preferred response, without direct supervision.

One innovative aspect of the subject matter described in this disclosure can be implemented as a method for refining a large language model including prompting the large language model to respond to a query with a thought and response pair, where the thought provides reasoning for the response, and, in response, receive a first thought and response pair. The first thought and response pair is evaluated in view of the query by a judge large language model that provides feedback based on scores for the thought and the response in the first thought and response pair. A revised prompt is generated based on the feedback to respond to the query with a thought and response pair and the revised prompt is provided to the large language model to receive a second thought and response pair. The large language model is refined based on the first thought and response pair and the second thought and response pair to modify operational parameters of the large language model.

One innovative aspect of the subject matter described in this disclosure can be implemented as a system for refining a large language model. The system may include one or more processors, and a memory communicatively coupled with the one or more processors and storing instructions that, when executed by the one or more processors, causes the one or more processors to be configured to perform various operations. The one or more processors may be configured to prompt the large language model to respond to a query with a thought and response pair, where the thought provides reasoning for the response, and in response receive a first thought and response pair. The one or more processors may be further configured to evaluate the first thought and response pair in view of the query by a judge large language model that provides feedback based on scores for the thought and the response in the first thought and response pair. The one or more processors may be further configured to generate a revised prompt based on the feedback to respond to the query with a thought and response pair and to provide the revised prompt to the large language model to receive a second thought and response pair. The one or more processors may be further configured to refine the large language model based on the first thought and response pair and the second thought and response pair to modify operational parameters of the large language model.

One innovative aspect of the subject matter described in this disclosure can be implemented as a method for refining a large language model including prompting the large language model to respond to a query with multiple responses. The multiple responses are evaluated in view of the query by a judge large language model that provides scores for each of the multiple responses and a preference pair is generated from the multiple responses and associated scores, where the preference pair includes a first response designated as a preferred response based on a first score associated with the first response and a second response designated as a non-preferred response based on a second score associated with the second response. The large language model is refined based on the preference pair to modify operational parameters of the large language model to align with the preferred response.

One innovative aspect of the subject matter described in this disclosure can be implemented as a system for refining a large language model. The system may include one or more processors, and a memory communicatively coupled with the one or more processors and storing instructions that, when executed by the one or more processors, causes the one or more processors to be configured to perform various operations. The one or more processors may be configured to prompt the large language model to respond to a query with multiple responses. The one or more processors may be further configured to cause the multiple responses to be evaluated in view of the query by a judge large language model that provides scores for each of the multiple responses. The one or more processors may be further configured to cause a preference pair to be generated from the multiple responses and associated scores, where the preference pair includes a first response designated as a preferred response based on a first score associated with the first response and a second response designated as a non-preferred response based on a second score associated with the second response. The one or more processors may be further configured to refine the large language model based on the preference pair to modify operational parameters of the large language model to align with the preferred response.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6 shows an illustrative flow chart depicting a method for refining a large language model using an unsupervised alignment process, according to some implementations.

FIG. 7 shows an illustrative flow chart depicting another method for refining a large language model using an unsupervised alignment process, according to some implementations.

Like reference numbers and designations in the various drawings indicate like elements.

DETAILED DESCRIPTION

Figure 1:
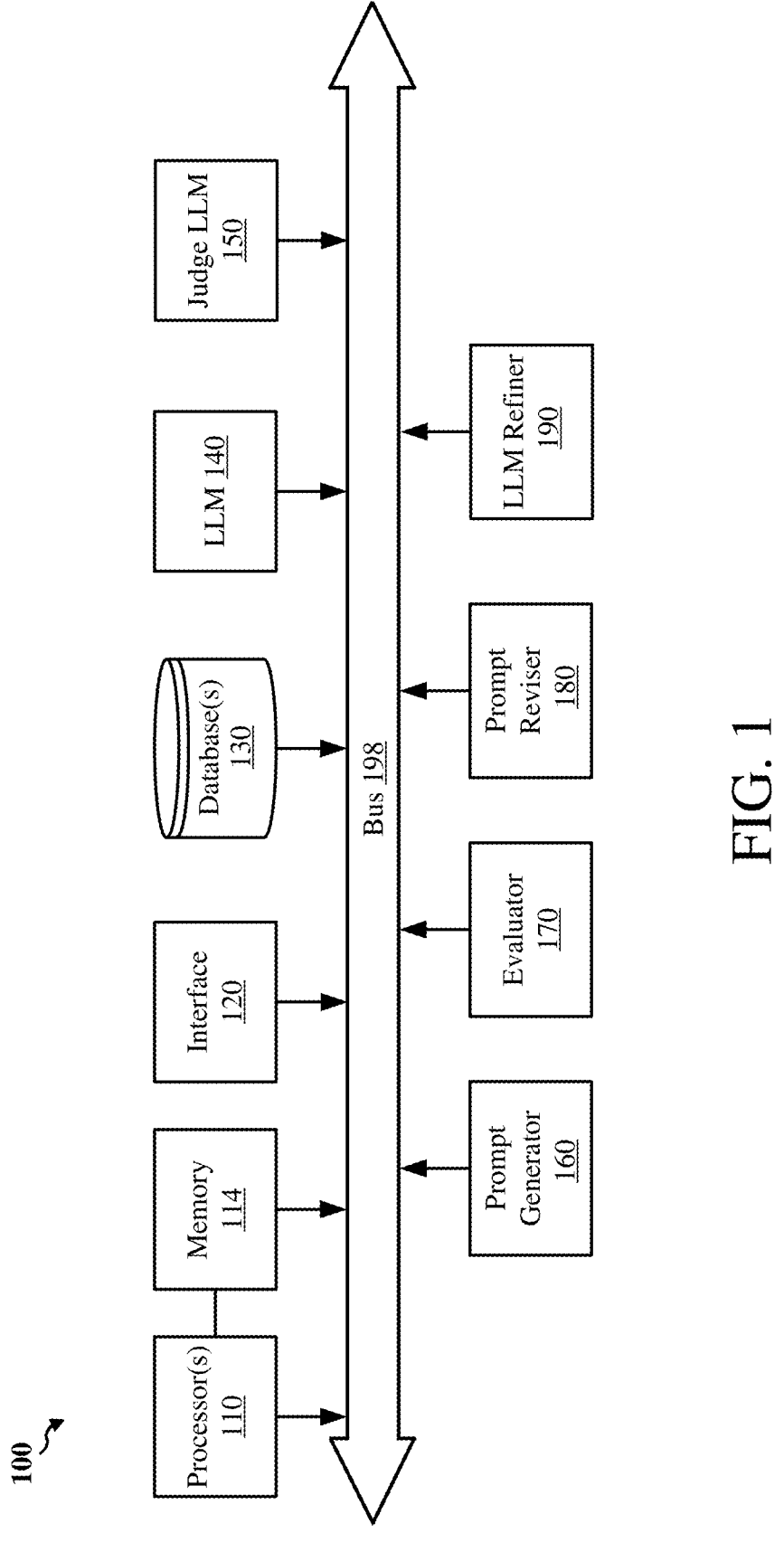
FIG. 1 illustrates a system for refining a large language model, according to some implementations.

Training for Large Language Models (LLMs), such as Deep LLMs, typically includes a refinement process in which these models are tuned to generate responses that align with human expectations, particularly for tasks demanding deep thinking, such as logical reasoning, creative synthesis, or judgment. Alignment is important to enabling deep thinking in large language models, because without proper alignment, even the most capable reasoning architectures may produce outputs that are misleading, unhelpful, or misaligned with human intent. As discussed herein, a training method for LLMs includes alignment that overcomes limitations in existing approaches.

A standard training and alignment framework typically consists of a multi-stage process including supervised fine-tuning and reinforcement learning from human feedback (RLHF), and, in some cases, preference modeling or reward modeling. For example, after pretraining a model to capture intricate linguistic and knowledge patterns, alignment employs supervised fine-tuning (SFT) with expert-crafted instruction-response datasets to guide the model toward human-like outputs. Reinforcement learning with human feedback (RLHF) is typically used to further refine the model by training a reward system based on human evaluations. Techniques such as Proximal Policy Optimization (PPO) are often used to iteratively optimize the model based on this reward signal.

The standard alignment framework, however, reveals deficiencies when applied to Deep LLMs for deep thinking tasks. The requirement for human data in the form of expert-crafted instruction-response datasets and feedback in RLHF often fails to capture the nuances of abstract or novel problems, leading to over-optimization on common patterns at the expense of true logical inference or creativity. Additionally, biases in training data and annotator judgments can skew outputs, undermining the model's ability to generalize across diverse reasoning scenarios.

To address limitations of the existing approaches, a system configured for refining a pretrained LLM uses using an unsupervised alignment process for enhanced reasoning and deep thinking capabilities. The LLM may be prompted to produce multiple responses, which are evaluated with a trained judge LLM, from which a preferred response and non-preferred response is selected. The LLM may be refined based on the preferred and non-preferred responses, e.g., using direct preference optimization (DPO), to directly optimize the policy of the LLM to align with the preferred response. For example, in some implementations, the LLM may be prompted to produce multiple responses, e.g., a pair of responses, that the judge LLM evaluates and selects a preferred response and non-preferred response. In another implementation, the LLM may be prompted to produce a thought and response pair, which is evaluated by the judge LLM, and the evaluation from the judge LLM is used to automatically revise the prompt, e.g., using preference optimization (PO). The LLM receives the revised prompt and produces a second thought and response pair. The first thought and response pair, for example, may be selected as the preferred response and the second thought and response pair may be selected as the non-preferred response, for the refinement of the LLM. An iterative search and optimization procedure may be used to explore the desired space enabling the model to improve deep thinking capabilities without direct supervision. The refinement procedure leads to improved performance and improvements from thinking on non-reasoning categories, such as marketing, health and general knowledge, in addition to more traditional reasoning and problem-solving tasks.

FIG. 1 shows a system 100 for refining a large language model, according to some implementations. Various aspects of the system 100 disclosed herein are generally applicable for training a large language model using an unsupervised alignment process. The system 100 includes a combination of one or more processors 110, a memory 114 coupled to the one or more processors 110, an interface 120, one or more databases 130, a prompt generator 160, an evaluator 170, a prompt reviser 180, and an LLM refiner 190. In some implementations, the various components of the system 100 are interconnected by at least a data bus 198. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for transmitting or receiving (e.g., over a communications network) transmissions, input data, and/or instructions to or from a computing device of a user, outputting data (e.g., over the communications network) to the computing device of the user, providing an input interface for the user and outputting results to the computing device of the user, and the like. Specifically, the interface 120 may be used to receive queries or to receive and transmit communications to users or administrators or to communicate with non-local aspects of the system 100, such as one or more external LLMs. The interface 120 may also be used to provide or receive other suitable information, such as computer code for updating one or more programs stored on the system 100, internet protocol requests and results, or the like. An example interface includes a wired interface or wireless interface to the internet or other means to communicably coupled with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or administrator.

The database 130 stores data associated with the system 100, such as data objects, algorithms, weights, models, modules, engines, user information, values, ratios, historical data, recent data, current or real-time data, files, plugins, extracted data and/or metadata, arrays, tags, identifiers, prompts, queries, replies, feedback, insights, formats, characteristics, features, and/or components, among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. In some implementations, the database 130 includes a relational database capable of presenting information as data sets in tabular form and capable of manipulating the data sets using relational operators. The database 130 may store queries or other data that may be used to generate queries for a desired space for enhanced performance of the LLM to be refined.

The LLM 140 may be any suitable large language model, e.g., that may be designed for tasks, such as natural language processing, text generation, and multimodal applications. The LLM 140 may be configured to respond to prompts, including separating its thought and response. The LLM 140 may be pre-trained with vast amounts of domain general textual data (e.g., from the internet), utilize artificial neural networks (ANNs) with millions to billions or even trillions of weights or parameters, be trained through self-supervised and/or semi-supervised methods, incorporate one or more aspects of the transformer architecture and/or mixture of experts (MoE), operate in part based on predicting a next token from an input, fine-tuned to perform various natural language processing (NLP) tasks, configured to an process and understand both visual data and textual data together, and include multiple layers of transformer blocks containing overall billions or even trillions of parameters or weights. The LLM 140 may be refined using an unsupervised alignment process, as discussed herein. Example LLMs Llama-3B by Meta AI, Mistral 7B by Mistral AI, Gemma 2 2B and 9B by Google, Phi-3 Mini by Microsoft, Stable LM 2 1.6B and 3B by Stability AI, and Qwen 2.5 3B by Alibaba Cloud, or another suitable type of ML-based neural network compatible with processing and reasoning. It should be understood that while LLM 140 is illustrated as coupled to the system 100 via the bus 198, the LLM 140 may be externally located and may be coupled to the remainder of the system 100 via the interface 120.

The Judge LLM 150 may be configured to evaluate responses provided by the LLM 140 in view of the query presented based on the LLM-as-Judge process. In some implementations, the Judge LLM 150 may be a relatively larger LLM than LLM 140, while in other implementations, it may be comparably sized and may be the LLM 140. The LLM 150 may be pre-trained with vast amounts of domain general textual data (e.g., from the internet), utilize artificial neural networks (ANNs) with millions to billions or even trillions of weights or parameters, be trained through self-supervised and/or semi-supervised methods, incorporate one or more aspects of the transformer architecture and/or mixture of experts (MoE), operate in part based on predicting a next token from an input, fine-tuned to perform various natural language processing (NLP) tasks, configured to an process and understand both visual data and textual data together, and include multiple layers of transformer blocks containing overall billions or even trillions of parameters or weights. The Judge LLM 150 may undergo additional supervised training in order to evaluate responses from the LLM, e.g., using a relatively small number of human labeled datapoints. For example, a small number, e.g., 100, labeled datapoints may be generated, of which 50 datapoints may be used to train the Judge LLM 150 and the remainder of labeled datapoints used to test the Judge LLM 150. Once trained, the Judge LLM 150 may evaluate the responses from the LLM 140 without supervision. Example LLMs that may be used as the Judge LLM 150 may include GPT-4o by OpenAI, Gemini 1.5 or PaliGemma by Google, Claude 3.5 Sonnet by Anthropic, DeepSeek-VL2 by DeepSeek, or another suitable type of ML-based neural network compatible with processing and reasoning. It should be understood that while Judge LLM 150 is illustrated as coupled to the system 100 via the bus 198, the Judge LLM 150 may be externally located and may be coupled to the remainder of the system 100 via the interface 120.

The prompt generator 160 may be configured, for example, to generate one or more prompts based on a query for the LLM 140, e.g., received via interface 120 or via database 130, and to submit the prompt to the LLM 140. The prompt generator 160, for example, may prepend the query with instructions regarding the format of the response, e.g., to provide multiple responses or to separate the response from the reasoning, e.g., thought, used to generate the response. In some implementations, the prompt generator 160 may include aspects of the database 130, e.g., to obtain queries or formatting instructions for inclusion in the prompt. Additionally, in some implementations, the prompt generator 160 may include aspects of the LLM 140 or another LLM, e.g., to generate a natural language prompt. Additionally, in some implementations, the prompt generator 160 may include aspects of a prompt optimizer, which may be part of the prompt reviser 180, to optimize the prompt for the LLM 140. The prompt may be optimized using LLMs as an optimizer. For example, the prompt may be optimized using an existing prompt, along with thoughts, and response from an LLM, where either the thoughts or response is wrong, that are sent to an LLM to compose suggestions on what can be improved. A second LLM agent may then apply the suggestions to generate the new optimized prompt.

The evaluator 170 may be configured, for example, to receive responses from the LLM 140 and to prompt the Judge LLM 150 to evaluate the responses in view of the query. For example, the Judge LLM 150 may be prompted to score each response from the LLM 140. In some implementations, the response may include both the response and associated thought, e.g., reasoning, for the response, and the Judge LLM 150 may be instructed to score both the thought and the response. The Judge LLM 150 may be further prompted to compare the scores for the responses to one or more predetermined thresholds, e.g., to determine if the thought and response may be considered "correct" or "incorrect" in view of the query. The Judge LLM 150 may be further prompted to determine whether the thought and response are consistent, e.g., based on the scores. The Judge LLM 150 may be further prompted to select a preferred (or chosen) response, e.g., thought and response pair, and a non-preferred (or rejected) response, e.g., thought and response pair, based on the scores and, in some implementations, to reject the responses if both responses are unsatisfactory, e.g., no response exceeds a predetermined threshold or if the difference in scores for the responses does not exceed a predetermined threshold.

The prompt reviser 180 may be configured, for example, to revise the prompt based on feedback provided by the Judge LLM 150, e.g., based on the scores of the responses, the determined correctness of the responses, the consistency of the responses (e.g., the thought and response pair), or any combination thereof. The prompt reviser 180, for example, may include a prompt optimizer that users an LLM Examiner that evaluates the feedback information from the Judge LLM 150 to generate a textual "gradient" that describes the performance shortcomings in natural language, and an LLM Improver to edit the prompt in the opposite semantic direction to address the issues identified by the gradient. The LLM Examiner and LLM Improver, for example, may be the LLM 140, the Judge LLM 150 or one or more other LLMs.

The LLM refiner 190 may be configured, for example, to refine the LLM 140 based on a preferred response and a non-preferred response. The LLM refiner 190, for example, may use a direct preference optimization process in which a classification loss based on the preferred response is used to directly optimize the policy of the LLM 140 to align with the preferred (chosen) response, e.g., thought and response pair.

The prompt generator 160, evaluator 170, prompt reviser 180, and LLM refiner 190, as well as other components of the system including the LLM 140 and Judge LLM 150, are implemented in software, hardware, or a combination thereof. In some implementations, any one or more of the prompt generator 160, evaluator 170, prompt reviser 180, and LLM refiner 190 is embodied in instructions that, when executed by the processor 110, cause the system 100 to perform the operations. In various implementations, the instructions of one or more of the components, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples related to refining a large language model using an unsupervised alignment process are described with reference to the system 100, other suitable system configurations may be used.

Figure 2:
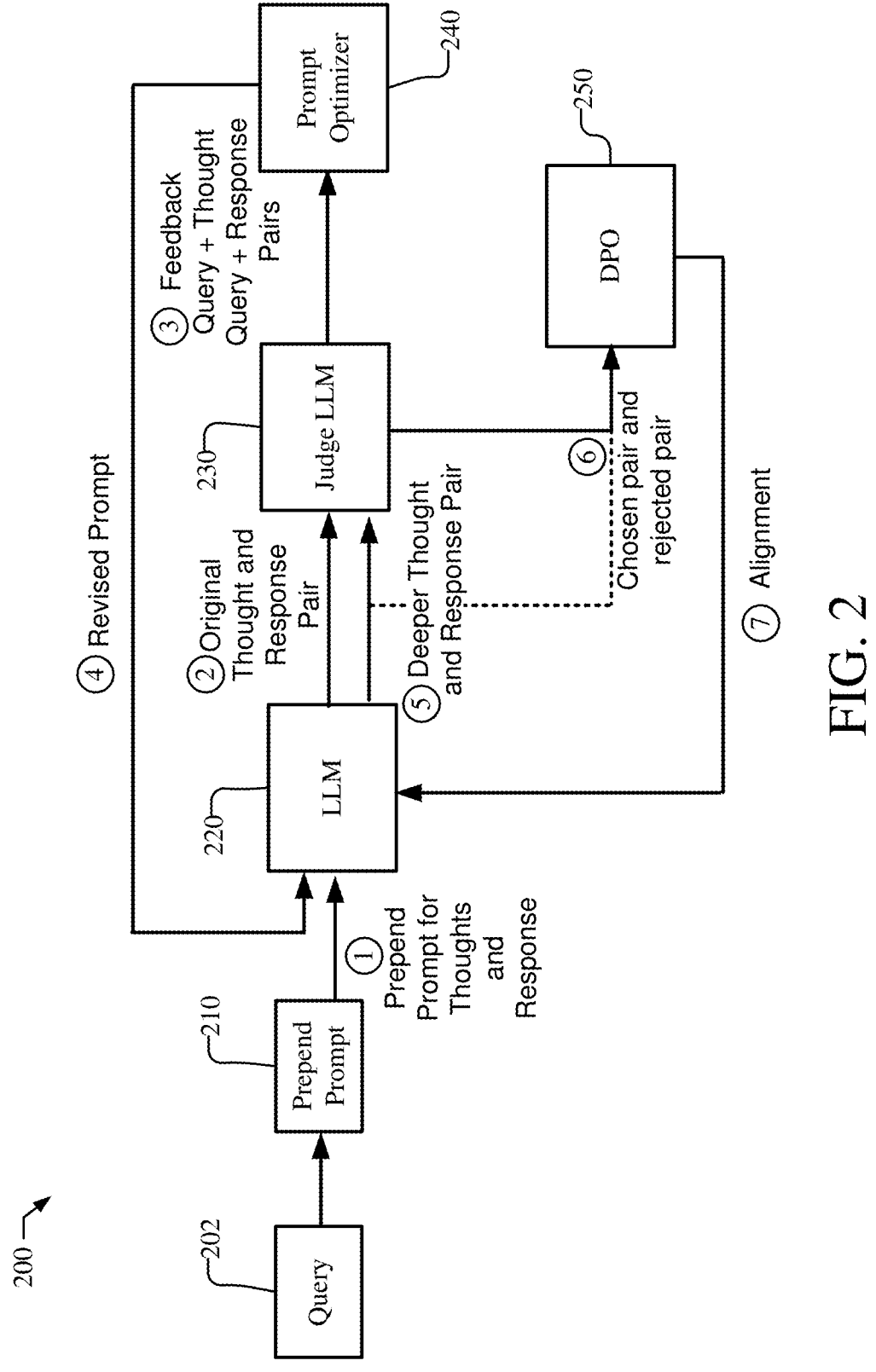
FIG. 2 illustrates a system architecture for refining a large language model using an unsupervised alignment process, according to some implementations.

FIG. 2 illustrates an example system architecture 200 configured for refining a large language model, according to some implementations. Various aspects of the system architecture 200 disclosed herein are generally applicable for training, e.g., refining, a large language model (LLM 220) using an unsupervised alignment process. The system architecture 200 may be based on system 100, shown in FIG. 1.

As illustrated, a query 202 is received, e.g., from a user or administrator via a computing device. The query 202, for example, may be a natural language query that is directed to the space in which enhanced performance of a large language model is desired. Multiple different queries may be sequentially provided, allowing the LLM 220 to be refined across the space in which enhanced performance of a large language model is desired.

The query 202 is received and a prepended prompt 210 is generated that includes the query and an output format instruction to separate the thought and response. The prepended prompt 210, for example, may include as an instruction to include a generic thought process or a specific thought process. For example, a prompt for a generic thought process may be constructed as "Respond to the following user query in a comprehensive and detailed way. You can write down your thought process before responding. Write your thoughts after 'Here is my thought process:' and write your response after 'Here is my response:'; User query: {user instruction}." A prompt for a specific thought process may be constructed as "Respond to the following user query in a comprehensive and detailed way. But first write down your internal thoughts. This must include your draft response and its evaluation. After this, write your final response after '<R>'; User query: {user instruction}." Both the prompt for the generic thought process and the specific thought process enforce output formatting so that the response part can be easily separated from the thoughts.

As indicated by reference (1), the prepended prompt is provided to the LLM 220 that is to be refined. The LLM 220, for example, is pretrained on large datasets, but is to be further trained to fine-tuning or refine the LLM 220 for specific tasks or behaviors. The LLM 220, for example, may be a pre-existing model that has not been previously fine-turned, and is to be refined to perform specific tasks or behaviors. In some implementations, the LLM 220 may be the LLM 140, shown in FIG. 1. As indicated by reference (2), in response to the prepended prompt, the LLM 220 produces a first thought and response pair, sometimes referred to as an original thought and response pair.

The original thought and response pair is received from the LLM 220 and is evaluated by a Judge LLM 230 in an LLM-as-a-Judge process. The Judge LLM 230, for example, may be a different LLM than the LLM 220 being refined. For example, the Judge LLM 230 may be a larger LLM than the LLM 220 being refined. In some implementations, however, the Judge LLM 230 may be the LLM 220. The Judge LLM 230 may be trained to evaluate responses from the LLM 220 to prompts based on a relatively small number of human labeled datapoints. For example, 100 labeled datapoints may be generated, and 50 datapoints may be used to train the Judge LLM 230 and the remainder of labeled datapoints used to test the Judge LLM 230. Once trained, the Judge LLM 230 may evaluate the responses from the LLM 220 without supervision.

The Judge LLM 230 reviews the original thought and response pair and as indicated by reference (3) provides feedback based on scores for each of the thought and the response in the original thought and response pair. In some implementations, the scores for each of the thought and the response in the first thought and response pair are generated in view of the original query. For example, the user query and the original thought may be provided to the Judge LLM 230 to obtain a score for the thought, and the user query and the original response may be provided to the Judge LLM 230 to obtain a score for the response. The Judge LLM 230 may determine the correctness or the incorrectness of the thought and a determination of the correctness or the incorrectness of the response based on the scores. For example, the score for the thought may be applied to a predetermined threshold to determine if the thought is considered correct or incorrect. Similarly, the score for the response may be applied to the same or a different predetermined threshold to determine if the response is considered correct or incorrect. Thus, four possibilities are possible: a correct thought and correct response, a correct thought and incorrect response, an incorrect thought and correct response, and an incorrect thought and incorrect response. The feedback provided by the Judge LLM 230 may include or may be based on the consistency between the results for the thought and the response, e.g., based on the scores themselves or whether the thought and response are in the same category of correct or incorrect. The consistency provided in the feedback may be useful to explain causality and why the thought results in the response.

A prompt optimizer 240 receives the feedback on the query and thought pair and query and response pair from the Judge LLM 230, along with the existing prompt, e.g., which may be passed through the LLM 220 and Judge LLM 230. For example, in some implementations, a variable for the existing prompt may be initiated, e.g., designated as existing_prompt, and the variable may be passed to the LLM 220, Judge LLM 230, to the prompt optimizer 240. The prompt optimizer 240 generates a revised prompt for the LLM 220 for the query based on the feedback. Similar to the prepended prompt, the revised prompt includes an output format instruction to separate the thought and response. The prompt optimizer 240, for example, may include an LLM Examiner that evaluates the feedback information from the Judge LLM 230 and generates a textual "gradient" that describes performance shortcomings in natural language, and is used to guide improvements. The gradient, for example, may explain why the prompt resulted in the scores for thought and response, or the correct or incorrect determination for the thought and response, or the consistency between the results for the thought and response. The gradient guides an LLM Improver to edit the prompt in the opposite semantic direction creating a revised prompt that addresses the issues identified by the gradient.

As indicated by reference (4), the revised prompt is provided to the LLM 220 that is to be refined. In response to the revised prompt, as indicated by reference (5), the LLM 220 produces a second thought and response pair, sometimes referred to as a deeper thought and response pair.

In some implementations, the deeper thought and response pair is received and evaluated by the Judge LLM 230 in the LLM-as-a-Judge process. The Judge LLM 230, for example, may score each of the thought and the response in the deeper thought and response pair. The Judge LLM 230, for example, may select a chosen thought and response pair and a rejected thought and response pair based on the scores attributed to original thought and response pair and the scores attributed to the deeper thought and response pair. For example, the thought and response pair with better, e.g., higher, scores may be selected as the chosen pair and the remaining pair is selected as the rejected pair. In some implementations, if the scores attributed to the deeper thought and response pair is not above a minimum threshold or substantially higher than the scores attributed to the original thought and response pair, e.g., the differential is not above a differential threshold, then another iteration of prompt optimization may be performed, e.g., the Judge LLM 230 may provide feedback on the on the query and deeper thought pair and query and deeper response pair to the prompt optimizer 240. In some implementations, the Judge LLM 230 may automatically select the deeper thought and response pair as the chosen thought and response pair and may automatically select the original thought and response pair as the rejected thought and response pair, regardless of scoring, and thus, the Judge LLM 230 may be bypassed in this implementation, as illustrated by the dotted arrow.

As indicated by reference (6), the original thought and response pair and the deeper thought and response pair are provided to the direct preference optimizer (DPO) 250. As indicated by reference (7), the DPO 250 refines the LLM 220 based on the original thought and response pair and the deeper thought and response pair to modify operational parameters of the LLM 220 for alignment, particularly for tasks demanding deep thinking, such as logical reasoning, creative synthesis, or judgment. The DPO 250, for example, performs direct preference optimization with, e.g., the original thought and response pair designated as the rejected response and the deeper thought and response pair designated as the chosen response. The DPO 250, for example, refines the LLM 220 using a classification loss based on the chosen (or preferred) response pair and the rejected (or non-preferred) response pair from the Judge LLM 230 to directly optimize the policy of the LLM 220 to align with the chosen (preferred) response pair.

Figure 3:
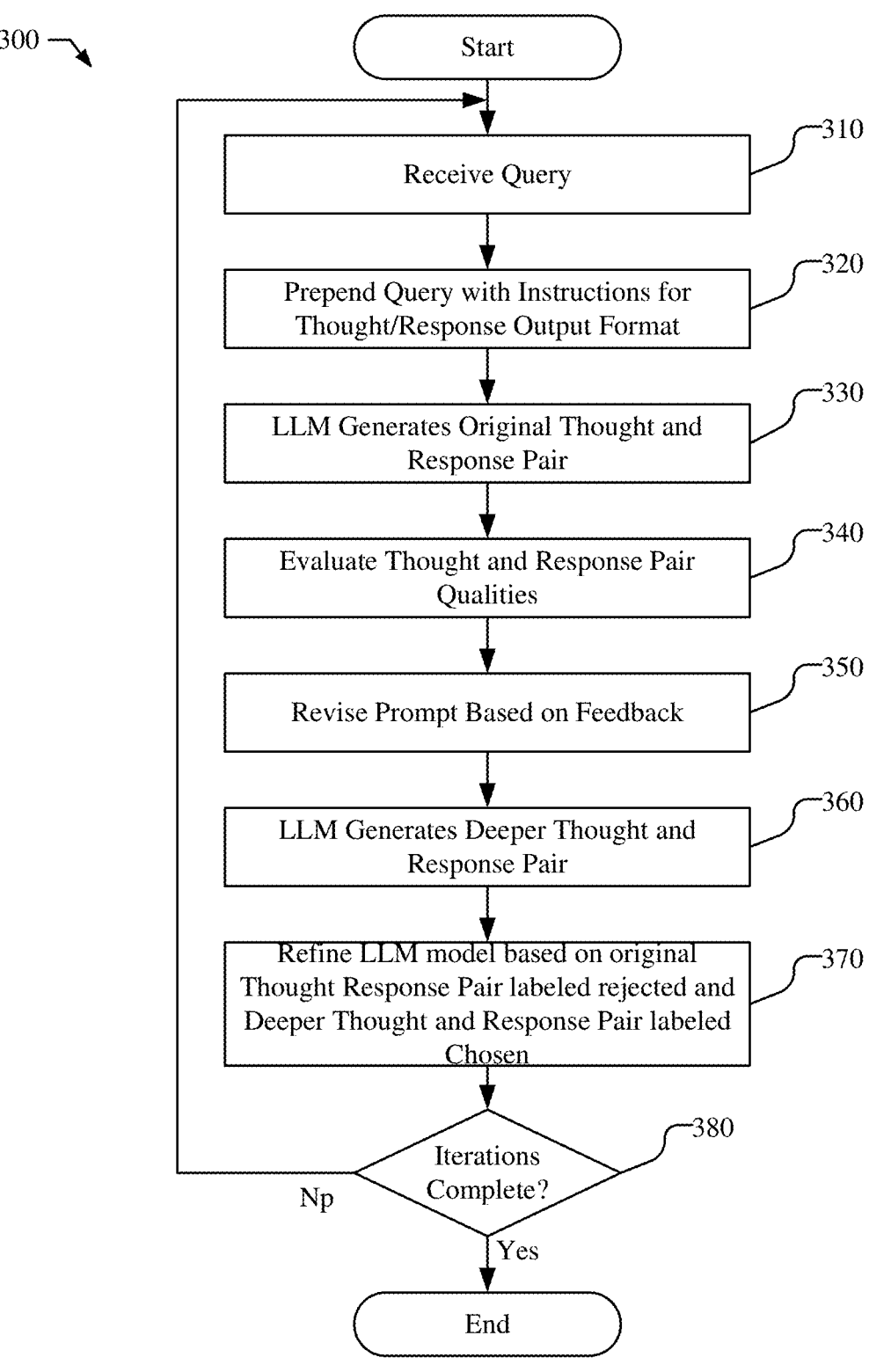
FIG. 3 is a flow chart illustrating a process for refining a large language model using an unsupervised alignment process, according to some implementations.

FIG. 3 is a flow chart illustrating a process 300 for refining a large language model using an unsupervised alignment process, according to some implementations. The process 300 may be performed using the system architecture 200 shown in FIG. 2.

As illustrated, at block 310, a query is received. The query may be a natural language query that is directed to the space in which enhanced performance of a large language model is desired.

At block 320, the query is prepended to generate a prompt with instructions to format the output with a separated thought and response.

At block 330, the LLM to be refined generates a response to the prepended prompt. In the response to the prepended prompt, the LLM produces an original thought and response pair that responds to the query.

At block 340, the original thought and response pair is evaluated by in an LLM-as-a-Judge process using a Judge LLM that is different, e.g., larger than the LLM to be refined. The Judge LLM reviews the original thought and response pair and the query and may provide separate scores for the thought and the response. The Judge LLM may compare the scores to predetermined thresholds which may be used to indicate whether each of the thought and the response may be considered correct or incorrect in view of the query. The Judge LLM may further determine whether the thought and the response are consistent, e.g., based on the scores. For example, the Judge LLM may compare the difference in the scores for the thought and response is less than a predetermined threshold to indicate that the thought and response are consistent, and is otherwise considered inconsistent. In another implementation, the Judge LLM may determine whether the thought and response are both correct or both incorrect to determine if the consistency.

At block 350, the prompt is revised based on the feedback, e.g., including the scores, correct or incorrect category, consistency, or any combination thereof, provided by the LLM-as-a-Judge process. The revision of the prompt may be performed by an automatic prompt optimizer that evaluates the feedback and generates a textual "gradient" that describes performance shortcomings in natural language, e.g., why the prompt resulted in the scores for the thought and the response or the correct or incorrect determinations, or the consistency between the results for the thought and response. The automatic prompt optimizer may use the gradient as a guide to edit the prompt in the opposite semantic direction to produce the revised prompt that addresses the issues identified by the gradient.

At block 360, the LLM to be refined produces a deeper thought and response pair that responds to the revised prompt.

At block 370, the LLM is refined based on the original thought response pair, which may be labeled as rejected, and the deeper thought response pair, which may be labeled chosen. The refinement of the LLM, for example, may be performed by direct preference optimization, which uses a classification loss based on the chosen (or preferred) response pair and the rejected (or non-preferred) response pair to directly optimize the policy of the LLM. In some implementations, before refining the LLM the deeper thought and response pair may be first evaluated by in the LLM-as-a-Judge process to ensure that the deeper thought and response pair is considered correct or is scored substantially higher than the original thought and response pair. For example, if the deeper thought and response pair is not considered correct or is not scored substantially higher than the original thought and response pair, then another iteration of prompt revision may be performed.

If the desired space for enhanced performance for the LLM has not been addressed, additional iterations may be performed. Thus, at block 380, if all desired iterations have not been completed, the process flows back to block 310 where a new query is received and the process repeats. If all desired iterations have been completed, the process may end and the LLM, which has been refined using the unsupervised alignment process may be deployed.

Figure 4:
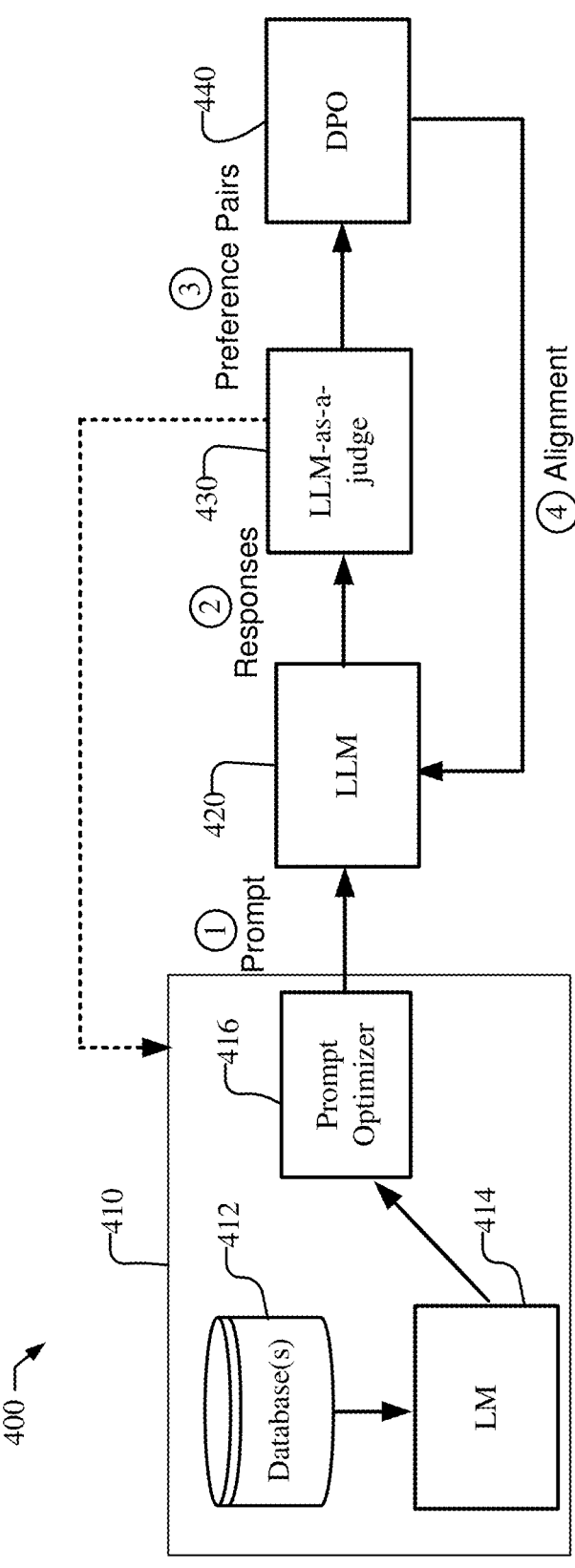
FIG. 4 illustrates another system architecture for refining a large language model using an unsupervised alignment process, according to some implementations.

FIG. 4 illustrates another example system architecture 400 configured for refining a large language model, according to some implementations. Various aspects of the system architecture 400 disclosed herein are generally applicable for training a large language model (LLM 220) using an unsupervised alignment process. The system architecture 400 may be based on system 100, shown in FIG. 1.

As illustrated, a prompt generator 410 is used to automatically generate prompts for the LLM 420. The prompt generator 410, for example, may include a database 412 and a language model LM 414 and, in some implementations, a prompt optimizer 416 that may optimize the prompt in response to a Judge LLM 430. The database 412, for example, provides data related to the desired space for enhanced performance for the LLM 420, while the LM 414 is used to generate queries directed to the desired space. The prompt optimizer 416 generates prompts based on the queries provided by the LM 414. The prompts include instructions to response to a query with multiple responses. In some implementations, the prompt generator 410 or a portion thereof, such as the database 412 and LM 414, may be used to provide the query 202 in FIG. 2.

As indicated by reference (1), the prompt is provided to the LLM 420 that is to be refined. The LLM 420, for example, is pretrained on large datasets, but is to be further trained to fine-tuning or refine the LLM 420 for specific tasks or behaviors. The LLM 420, for example, may be a pre-existing model that has not been previously fine-turned, and is to be refined to perform specific tasks or behaviors. In some implementations, the LLM 420 may be the LLM 140, shown in FIG. 1. As indicated by reference (2), the LLM 420 produces a plurality of responses, e.g., a pair of responses, in response to the prompt.

The responses are received from the LLM 420 and are evaluated by a Judge LLM 430 in an LLM-as-a-Judge process. The Judge LLM 430, for example, may be a different LLM than the LLM 420 being refined. For example, the Judge LLM 430 may be a larger LLM than the LLM 420 being refined. In some implementations, however, the Judge LLM 430 may be the LLM 420. The Judge LLM 430 may be trained to evaluate responses from the LLM 420 produced in response to prompts generated by the prompt generator 410 based on a relatively small number of human labeled datapoints. For example, 100 labeled datapoints may be generated, and 50 datapoints may be used to train the Judge LLM 430 and the remainder of labeled datapoints used to test the Judge LLM 430. Once trained, the Judge LLM 430 may evaluate the responses from the LLM 420 without supervision.

The Judge LLM 430 reviews responses from the LLM 420 and as indicated by reference (3) provides feedback in the form of preference pairs. The Judge LLM 430, for example, may score each of the responses and may label the responses as preferred (e.g., chosen) or non-preferred (e.g., rejected) based on the scores. For example, the response with a relatively higher score may be selected as preferred and the score with the relatively lower score may be selected as non-preferred. In some implementations, the Judge LLM 430 may compare the scores to a predetermined threshold to determine if either response may be determined "correct" and may reject both responses if neither is considered correct. In some implementations, the Judge LLM 430 may compare a difference in the scores for the pair of responses and if the difference is less than a predetermined threshold may reject both responses. If both responses are rejected, the Judge LLM 430 may not provide feedback in the form of preference pairs at reference (3), but instead may signal the prompt optimizer 416 in the prompt generator 410 to revise the prompt, e.g. by formulating suggestions to improve the prompt and applying such suggestions to optimize the prompt, (or generate a new prompt) for the LLM 420, as indicated by the dotted arrow.

As indicated by reference (3), the preference pairs are provided to the direct preference optimizer (DPO) 440. The DPO 440 refines the LLM 420 using the preference pairs to modify operational parameters of the LLM 420 for alignment, particularly for tasks demanding deep thinking, such as logical reasoning, creative synthesis, or judgment, as indicated by reference (4). The DPO 440, for example, performs direct preference optimization with, e.g., the preference pairs to refine the LLM 420 using a classification loss based on the preferred response and the non-preferred response from the Judge LLM 430 to directly optimize the policy of the LLM 420 to align with the preferred response.

Figure 5:
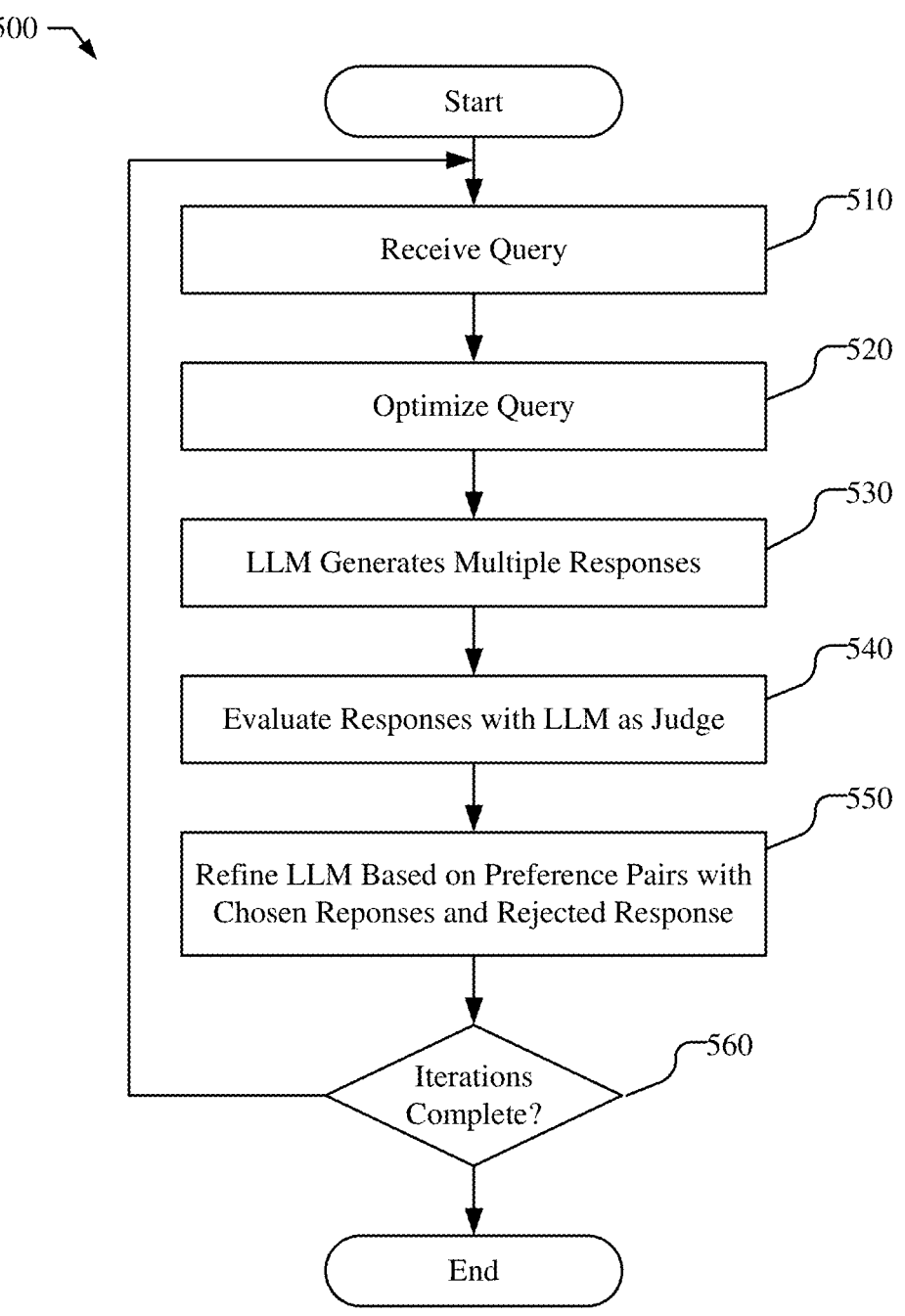
FIG. 5 is another flow chart illustrating a process for refining a large language model using an unsupervised alignment process, according to some implementations.

FIG. 5 is a flow chart illustrating a process 500 for refining a large language model using an unsupervised alignment process, according to some implementations. The process 500 may be performed using the system architecture 400 shown in FIG. 4.

As illustrated, at block 510, a query is received. The query may be a natural language query that is directed to the space in which enhanced performance of a large language model is desired. The query may be generated by the database 412 and LM 414 in the prompt generator 410 as discussed in FIG. 4.

At block 520, the query is optimized to generate a prompt, e.g., by the prompt optimizer 416 in the prompt generator 410.

At block 530, the LLM to be refined generates multiple responses, e.g., a pair of responses, to the prompt.

At block 540, the pair of responses from the LLM are evaluated in an LLM-as-a-Judge process using a Judge LLM. The Judge LLM identifies a preferred response and a non-preferred response.

At block 550, the LLM is refined based on the preferred response and the non-preferred response. The refinement of the LLM, for example, may be performed by direct preference optimization, which uses a classification loss based on the preferred response and the non-preferred) response to directly optimize the policy of the LLM to align with the preferred response.

If the desired space for enhanced performance for the LLM has not been addressed, additional iterations may be performed. Thus, at block 560, if all desired iterations have not been completed, the process flows back to block 510 where a new query is received and the process repeats. If all desired iterations have been completed, the process may end and the LLM, which has been refined using the unsupervised alignment process, may be deployed.

FIG. 6 shows an illustrative flow chart depicting an example method 600 for refining a large language model using an unsupervised alignment process, as discussed herein. The method 600 is described as a computer-implemented method, e.g., which may be performed by the system 100 illustrated in FIG. 1, e.g., configured with the system architecture 200 shown in FIG. 2 and discussed with respect to FIG. 3.

At 602, the method 600 includes prompting the large language model to respond to a query with a thought and response pair, where the thought provides reasoning for the response, and, in response, receive a first thought and response pair, e.g., as discussed in reference to LLM 220 and reference numbers (1) and (2) in FIG. 2 and in reference to blocks 320 and 330 in FIG. 3.

At 604, the first thought and response pair are evaluated in view of the query by a judge large language model that provides feedback based on scores for the thought and the response in the first thought and response pair, e.g., as discussed in reference to the Judge LLM 230 and reference numbers (2) and (3) in FIG. 2 and in reference to block 340 in FIG. 3. In some implementations, the judge large language model may be different than the large language model that is being refined. For example, the judge large language model may be larger than the large language model that is being refined.

At 606, a revised prompt is generated based on the feedback to respond to the query with a thought and response pair, e.g., as discussed in reference to the prompt optimizer 240 and reference numbers (3) and (4) in FIG. 2, and in reference to block 350 in FIG. 3. In some implementations, generating the revised prompt may include determining a gradient based on the feedback and using the gradient to optimize the thought and response by the large language model, e.g., as discussed in reference to the prompt optimizer 240 and reference numbers (3) and (4) in FIG. 2, and in reference to block 350 in FIG. 3.

At 608, the revised prompt is provided to the large language model to receive a second thought and response pair, e.g., as discussed in reference to the prompt optimizer 240 and LLM 220 and reference numbers (4) and (5) in FIG. 2, and in reference to block 360 in FIG. 3.

At 610, the large language model is refined based on the first thought and response pair and the second thought and response pair to modify operational parameters of the large language mode, e.g., as discussed in reference to the DPO 250 and LLM 220 and reference numbers (6) and (7) in FIG. 2, and in reference to block 370 in FIG. 3. In some implementations, refining the large language model based on the first thought and response pair and the second thought and response pair may include performing direct preference optimization with the first thought and response pair designated as a rejected response and the second thought and response pair designated as a chosen response, e.g., as discussed in reference to the DPO 250 and LLM 220 and reference number (7) in FIG. 2, and in reference to block 370 in FIG. 3.

In some implementations, the method may further include receiving the query, and generating a prompt that includes the query and an output format instruction to separate the thought and response, where prompting the large language model uses the prompt, e.g., as discussed in reference to query 202 and prepend prompt 210 and reference number (1) in FIG. 2 and in reference to blocks 310 and 320 in FIG. 3.

In some implementations, the scores for the thought and the response in the first thought and response pair may include a first score for the thought in view of the query and a second score for the response in view of the query, e.g., as discussed in reference to the Judge LLM 230 and reference numbers (2) and (3) in FIG. 2 and in reference to block 340 in FIG. 3. Additionally, in some implementations, the feedback may further include an indication of consistency between first score for the thought and the second score for the response determined by the judge large language model.

In some implementations, the feedback may include a determination of correctness or incorrectness of the thought for the query and a determination of correctness or incorrectness of the response for the query based on the scores for the thought and the response in the first thought and response pair, e.g., as discussed in reference to the Judge LLM 230 and reference numbers (2) and (3) in FIG. 2 and in reference to block 340 in FIG. 3. For example, the correctness or incorrectness of the thought or response may be determined based on a threshold.

In some implementations, the method may further include evaluating the second thought and response pair in view of the query by the judge large language model before refining the large language model based on the first thought and response pair and the second thought and response pair, e.g., as discussed in reference to the Judge LLM 230 and reference numbers (5) and (6) in FIG. 2 and in reference to block 370 in FIG. 3.

FIG. 7 shows an illustrative flow chart depicting an example method 700 for refining a large language model using an unsupervised alignment process, as discussed herein. The method 700 is described as a computer-implemented method, e.g., which may be performed by the system 100 illustrated in FIG. 1, e.g., configured with the system architecture 400 shown in FIG. 4 and discussed with respect to FIG. 5.

At 702, the method 700 includes prompting the large language model to respond to a query with multiple responses, e.g., as discussed in reference to LLM 420 and reference number (1) in FIG. 4 and in reference to block 520 and 530 in FIG. 5.

At 704, the multiple responses are evaluated in view of the query by a judge large language model that provides scores for each of the multiple responses, e.g., as discussed in reference to the Judge LLM 430 and reference number (2) in FIG. 4 and in reference to block 540 in FIG. 3. In some implementations, the judge large language model may be different than the large language model that is being refined. For example, the judge large language model may be larger than the large language model that is being refined.

At 706, a preference pair is generated from the multiple responses and associated scores, where the preference pair includes a first response designated as a preferred response based on a first score associated with the first response and a second response designated as a non-preferred response based on a second score associated with the second response, e.g., as discussed in reference to the Judge LLM 430 and reference number (3) in FIG. 4 and in reference to block 540 in FIG. 3.

At 708, the large language model is refined based on the preference pair to modify operational parameters of the large language model to align with the preferred response, e.g., as discussed in reference to the DPO 440 and LLM 420 and reference numbers (4) in FIG. 4, and in reference to block 550 in FIG. 5.

In some implementations, the method may further include receiving a query, and generating a prompt that includes the query and an output format instruction to include multiple responses, where prompting the large language model uses the prompt, e.g., as discussed in reference to prompt generator 410 and reference number (1) in FIG. 4 and in reference to blocks 510 and 520 in FIG. 5.

In some implementations, the method may further include evaluating the responses to determine at least one response exceeds a predetermined threshold before refining the large language model based on the preference pair, e.g., as discussed in reference to the Judge LLM 430 in FIG. 4.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "generating," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded with the broadest scope consistent with this disclosure, the principles and the novel features disclosed herein.

What is claimed is:

1. A method for refining a large language model, comprising:
   prompting the large language model to respond to a query with a thought and response pair, wherein the thought provides reasoning for the response, and, in response, receive a first thought and response pair;
   evaluating the first thought and response pair in view of the query by a judge large language model that provides feedback based on scores for the thought and the response in the first thought and response pair;
   generating a revised prompt based on the feedback to respond to the query with a thought and response pair;
   providing the revised prompt to the large language model to receive a second thought and response pair; and
   refining the large language model based on the first thought and response pair and the second thought and response pair to modify operational parameters of the large language model by performing direct preference optimization with the first thought and response pair designated as a rejected response and the second thought and response pair designated as a chosen response.

2. The method of claim 1, further comprising:
   receiving the query; and
   generating a prompt that includes the query and an output format instruction to separate the thought and response, wherein prompting the large language model uses the prompt.

3. The method of claim 1, wherein the judge large language model is different than the large language model that is refined.

4. The method of claim 1, wherein the scores for the thought and the response in the first thought and response pair comprises a first score for the thought in view of the query and a second score for the response in view of the query.

5. The method of claim 4, wherein the feedback further comprises consistency between first score for the thought and the second score for the response determined by the judge large language model.

6. The method of claim 1, wherein the feedback comprises a determination of correctness or incorrectness of the thought for the query and a determination of correctness or incorrectness of the response for the query based on the scores for the thought and the response in the first thought and response pair.

7. The method of claim 6, wherein correctness or incorrectness of the thought or response is determined based on a threshold.

8. The method of claim 1, wherein generating the revised prompt comprises determining a gradient based on the feedback and using the gradient to optimize the thought and response by the large language model.

9. The method of claim 1, further comprising evaluating the second thought and response pair in view of the query by the judge large language model before refining the large language model based on the first thought and response pair and the second thought and response pair.

10. A system for refining a large language model, comprising:
   one or more processors; and
   a memory communicatively coupled with the one or more processors and storing instructions that, when executed by the one or more processors, causes the one or more processors to be configured to:
      prompt the large language model to respond to a query with a thought and response pair, wherein the thought provides reasoning for the response, and in response receive a first thought and response pair;
      evaluate the first thought and response pair in view of the query by a judge large language model that provides feedback based on scores for the thought and the response in the first thought and response pair;
      generate a revised prompt based on the feedback to respond to the query with a thought and response pair;
      provide the revised prompt to the large language model to receive a second thought and response pair; and
      refine the large language model based on the first thought and response pair and the second thought and response pair to modify operational parameters of the large language model by performing direct preference optimization with the first thought and response pair designated as a rejected response and the second thought and response pair designated as a chosen response.

11. The system of claim 10, wherein the one or more processors are further configured to:
   receive the query; and
   generate a prompt that includes the query and an output format instruction to separate the thought and response, wherein the one or more processors is configured to prompt the large language model using the prompt.

12. The system of claim 10, wherein the judge large language model is different than the large language model that is refined.

13. The system of claim 10, wherein the scores for the thought and the response in the first thought and response pair comprises a first score for the thought in view of the query and a second score for the response in view of the query.

14. The system of claim 13, wherein the feedback further comprises consistency between first score for the thought and the second score for the response determined by the judge large language model.

15. The system of claim 10, wherein the feedback comprises a determination of correctness or incorrectness of the thought for the query and a determination of correctness or incorrectness of the response for the query based on the scores for the thought and the response in the first thought and response pair.

16. The system of claim 15, wherein correctness or incorrectness of the thought or response is determined based on a threshold.

17. The system of claim 10, wherein the one or more processors is configured to generate the revised prompt by being configured to determine a gradient based on the feedback and using the gradient to optimize the thought and response by the large language model.

18. The system of claim 10, wherein the one or more processors are further configured to evaluate the second thought and response pair in view of the query by the judge large language model before refining the large language model based on the first thought and response pair and the second thought and response pair.

* * * * *